(12) United States Patent
Hamada

(10) Patent No.: US 6,646,569 B2
(45) Date of Patent: Nov. 11, 2003

(54) NAVIGATION APPARATUS USING RADIO COMMUNICATION DEVICE

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 09/814,833

(22) Filed: Mar. 23, 2001

(65) Prior Publication Data

US 2001/0012782 A1 Aug. 9, 2001

Related U.S. Application Data

(60) Continuation of application No. 09/222,499, filed on Dec. 29, 1998, now Pat. No. 6,236,338, which is a division of application No. 08/685,397, filed on Jul. 23, 1996, now Pat. No. 5,890,070.

(30) Foreign Application Priority Data

Jul. 26, 1995 (JP) .............................................. 7-190381

(51) Int. Cl.[7] .............................................. G08G 1/123
(52) U.S. Cl. .................... 340/995.1; 340/988; 455/524; 455/456; 701/208
(58) Field of Search ................................ 340/995, 988, 340/990, 994, 825.49, 995.1–995.28; 455/524, 456, 432, 440, 465, 566, 575, 433; 701/208, 201; 246/166.1

(56) References Cited

U.S. PATENT DOCUMENTS

| 4,752,951 A | 6/1988 | Konneker ................... 455/456 |
| 4,947,452 A | 8/1990 | Hattori et al. ............... 455/440 |
| 5,020,091 A | 5/1991 | Krolopp et al. ............. 455/432 |
| 5,131,020 A | 7/1992 | Liebesny et al. ............ 455/422 |
| 5,187,810 A | 2/1993 | Yoneyama et al. .......... 455/524 |
| 5,255,307 A | 10/1993 | Mizikovsky ................. 455/432 |
| 5,335,276 A | 8/1994 | Thompson et al. ......... 380/266 |
| 5,400,392 A | 3/1995 | Nagashima et al. ........ 455/456 |
| 5,428,666 A | 6/1995 | Fyfe et al. ................... 455/432 |
| 5,444,444 A | 8/1995 | Ross ........................... 455/456 |
| 5,444,765 A | 8/1995 | Marui et al. ................. 455/432 |
| 5,463,675 A | 10/1995 | Gerszberg .................... 455/432 |
| 5,465,401 A | 11/1995 | Thompson ................... 455/558 |
| 5,586,338 A | 12/1996 | Lynch et al. ................. 455/433 |
| 5,675,492 A | 10/1997 | Tsuyuki ....................... 340/988 |
| 5,682,525 A | 10/1997 | Bouve et al. ................ 707/104 |
| 5,699,255 A | 12/1997 | Ellis et al. ................... 707/212 |
| 5,722,083 A | 2/1998 | Konig ........................... 455/517 |
| 5,890,070 A | * 3/1999 | Hamada ...................... 455/524 |
| 6,236,338 B1 | * 5/2001 | Hamada ...................... 340/995 |

FOREIGN PATENT DOCUMENTS

JP  4-51281  2/1992

OTHER PUBLICATIONS

English Abstract of Japanese Patent Application No. 4–51281.
Concise Statement of Relevance for Japanese Patent Application No. 4–51281.

* cited by examiner

*Primary Examiner*—Nina Tong
(74) *Attorney, Agent, or Firm*—Morgan & Finnegan, LLP

(57) ABSTRACT

When a radio communication device inputs a target place, it receives information of a radio control apparatus at the target place and those on the route from a database or a radio control apparatus. Upon reception of identification information of the radio control apparatus, the radio communication device compares it with the information of the radio control apparatus, and notifies the comparison result, thereby confirming its current position.

8 Claims, 8 Drawing Sheets

NAVIGATION APPARATUS USING RADIO COMMUNICATION DEVICE

This is a continuation of application Ser. No. 09/222,499, filed Dec. 29, 1998, which is now U.S. Pat. No. 6,236,338, which is a divisional of prior application Ser. No. 08/685,397, filed Jul. 23, 1996, which is now U.S. Pat. No. 5,890,070.

BACKGROUND OF THE INVENTION

The present invention relates to a radio communication device which can be connected to a plurality of radio control apparatuses.

A conventional navigation system displays the current position on a map using as a medium a GPS (global positioning system) that detects the latitude and longitude from information obtained by receiving radio waves transmitted from communication satellites in the outer space.

However, the prior art suffers the following problems.

Since radio waves transmitted from the communication satellites in the outer space must be used, the position cannot be measured at a position very close to a skyscraper or under the ground.

Since only the latitude and longitude of the terminal position are detected based on radio waves supplied from the communication satellites, each terminal must have area information required for navigation, and a large-capacity storage medium must be prepared on the terminal side.

SUMMARY OF THE INVENTION

It is an object of the present invention to provide a radio communication device which can be used as a navigation device even at a position very close to a skyscraper or under the ground.

It is another object of the present invention to provide a radio communication device which can be used as a navigation device that does not require any large-capacity storage device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (First Embodiment)

A railway transfer navigation system, which uses, as a radio communication medium, a personal handyphone system (PHS) that is used in Japan of digital cordless telephones adopting a microcell system in cellular type radio communication systems, will be described below as an example of a simple navigation system of the present invention.

Figure 1:
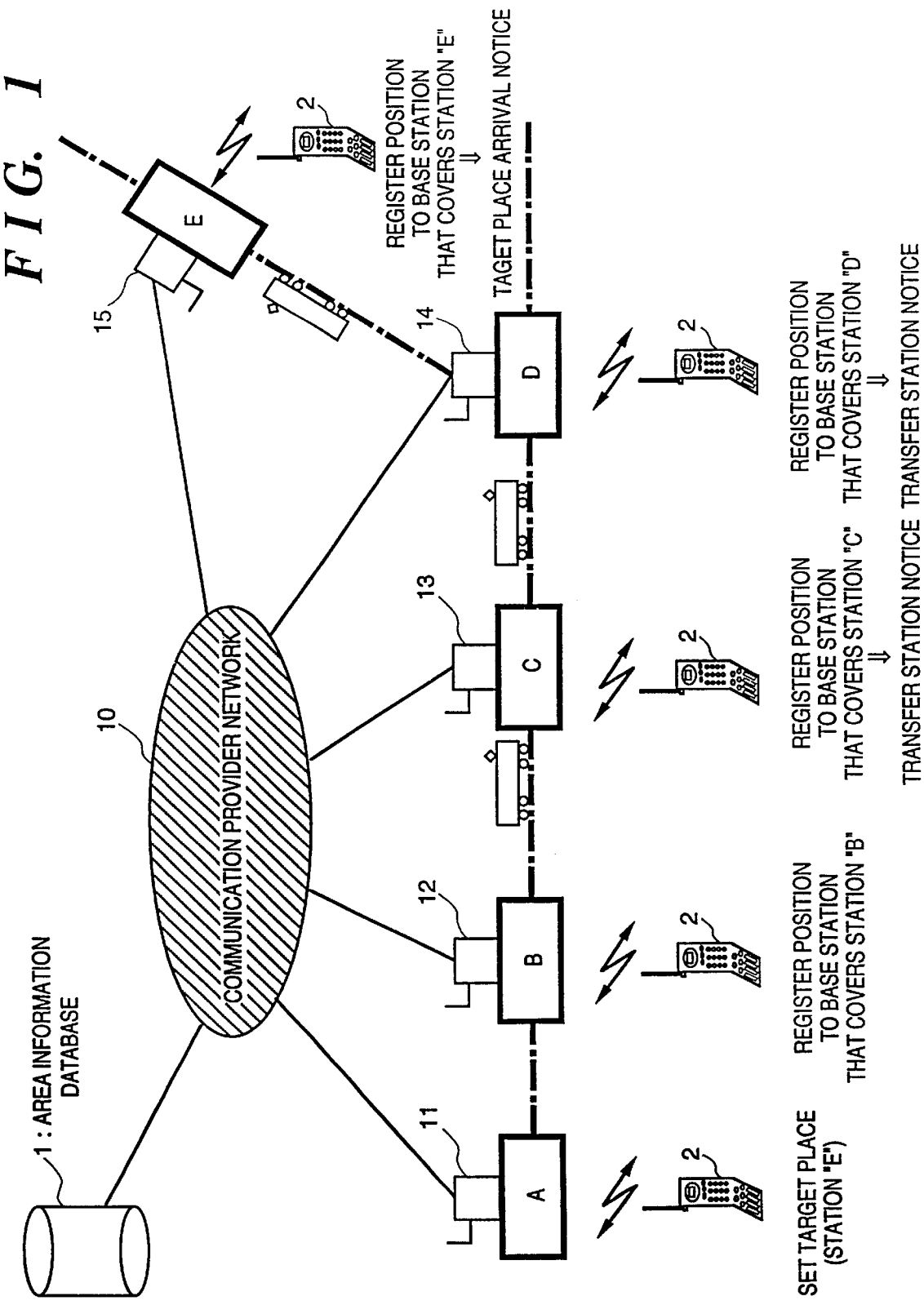
FIG. 1 is a diagram showing the concept of a railway transfer navigation system according to the first embodiment of the present invention.

FIG. 1 shows the concept of a railway transfer navigation system using the PHS as a medium.

Referring to FIG. 1, reference numeral 1 denotes an area information database for storing identification information of radio base stations and area information of the areas to be covered by the respective radio base stations in correspondence with each other; 2, a PHS navigation terminal having a display function; 10, a communication provider network that accommodates the radio base stations and the database; 11, a radio base station which covers a station "A" as an area; 12, a radio base station which covers a station "B" as an area; 13, a radio base station which covers a station "C" as an area; 14, a radio base station which covers a station "D" as an area; and 15, a radio base station which covers a station "E" as an area.

Figure 2:
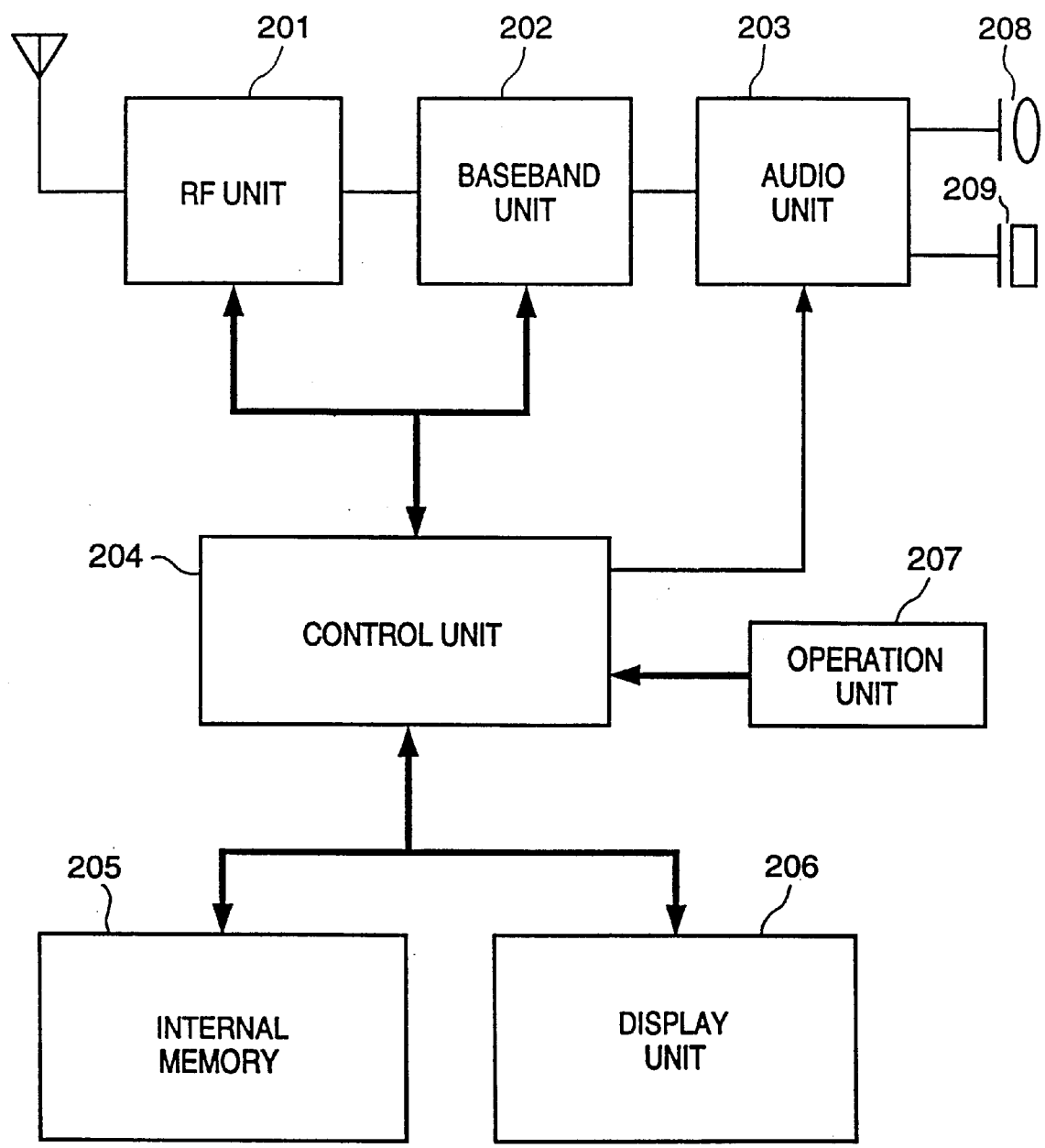
FIG. 2 is a block diagram showing a radio communication terminal in the first embodiment of the present invention.

FIG. 2 is a functional block diagram of the PHS navigation terminal of the present invention.

Referring to FIG. 2, reference numeral 201 denotes a radio unit (RF unit) for transmitting/receiving radio waves; 202, a baseband unit for converting a signal supplied from an audio unit or a control unit or a signal from the RF unit into a baseband signal; 203, an audio unit for controlling the input/output operations of an audio signal; 204, a control unit for controlling a speech communication and navigation of the PHS navigation terminal; 205, an internal memory for storing information for controlling the PHS navigation terminal, ID (identification) information, and the identification information of the radio base stations used when the PHS is used as a navigation terminal; 206, a display unit for displaying various kinds of information such as a telephone number; and 207, an operation unit for operating the PHS navigation terminal. The operation unit includes a hook key for attaining on-hook and off-hook operations, a ten-key pad for inputting a dial number, and function keys, and these keys are used for inputting a target place or destination when the PHS is used as a navigation terminal. Reference numeral 208 denotes a microphone for inputting an audio signal; and 209, a loudspeaker for outputting an audio signal.

The PHS terminal normally has an automatic position registration function of intermittently registering its position with respect to the base station in accordance with an instruction from the control unit, and this embodiment utilizes this function.

Figure 3:
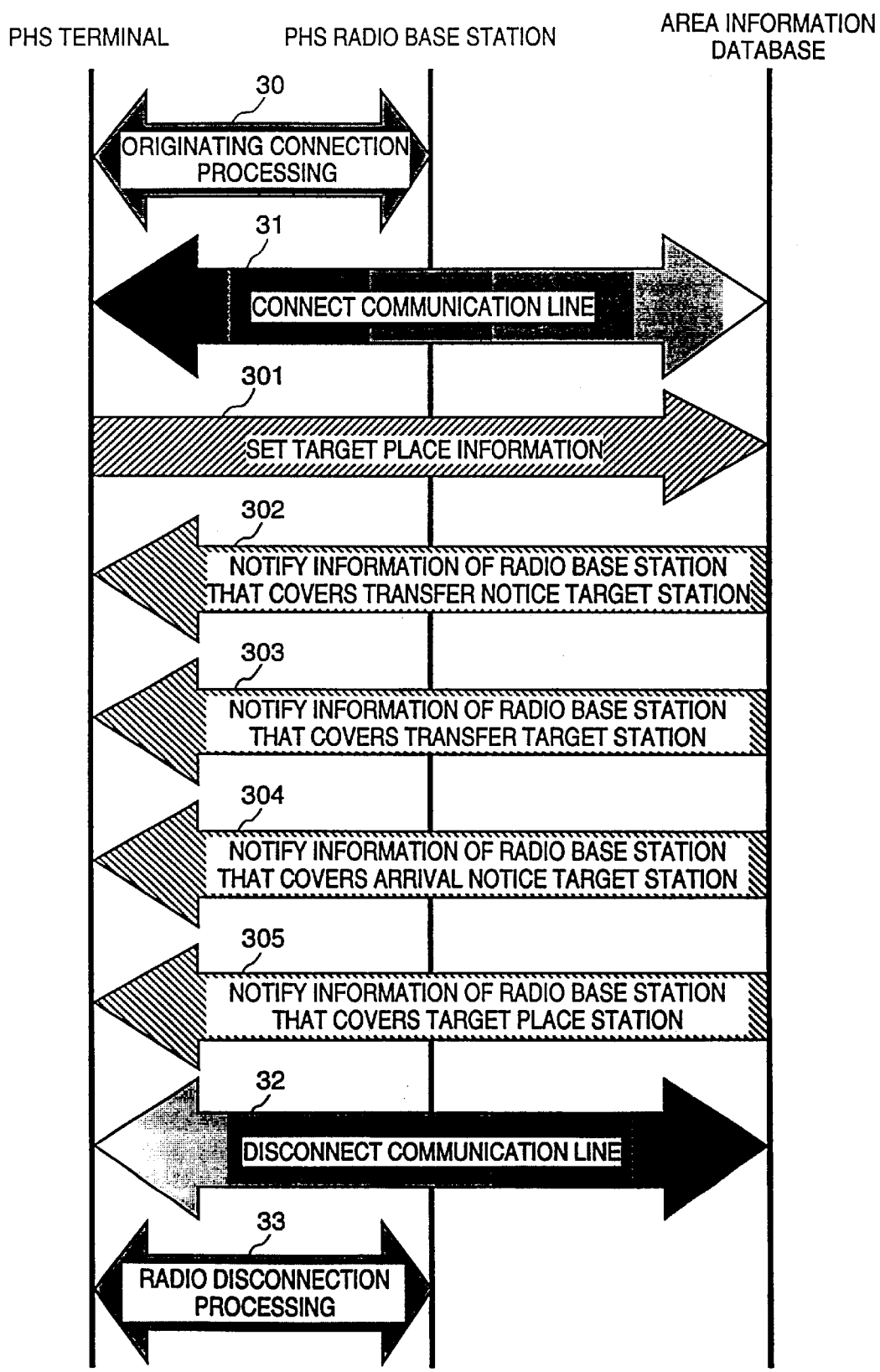
FIG. 3 is an area information database access sequence chart in the first embodiment (railway transfer database) of the first embodiment.

FIG. 3 is a sequence chart when the PHS navigation terminal (2), in which a target place has been set via the operation unit 207 upon departure, accesses the area information network via the radio stations and the communication provider network.

After the navigation terminal performs originating connection processing with respect to the area information database (30, 31), target place information set after the target place was set is notified (301). The area information database, which is notified of the target place, sends back identification information of the radio base stations that cover a transfer notice station, a transfer station, an arrival notice station, a target place station, and the like, as needed (302 to 305).

After the identification information of the radio base station is received, the navigation terminal disconnects the connection to the database (32, 33).

Figure 4:
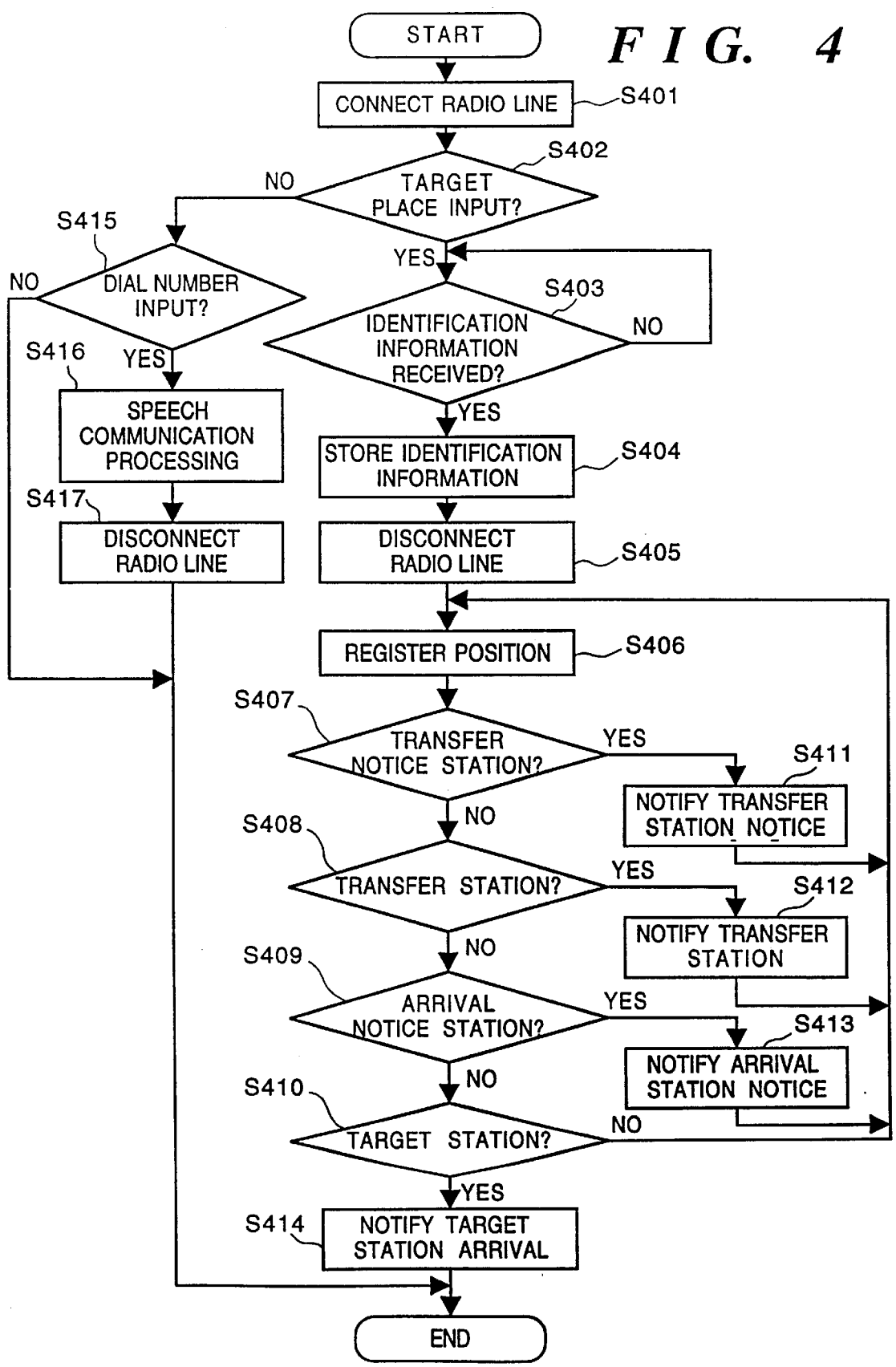
FIG. 4 is a flow chart showing the operation of a PHS simple navigation terminal in the first embodiment (railway transfer database) of the present invention.

FIG. 4 is a flow chart showing the operation of the PHS navigation terminal.

Referring to FIG. 4, the PHS navigation terminal is connected via a radio channel to the radio base station that covers the current position of the PHS navigation terminal in step S401. In this embodiment, the radio base station to be connected corresponds to the radio base station 11 equipped in the station "A".

In step S402, a target place (station "E") is set in the area information database (1) via the radio base station (11) and the communication provider network (10) at the departure station (station "A").

When the target place is input in step S402, the navigation terminal receives, from the area information database 1, information of the radio base stations which respectively cover the target station (station "E"), a transfer station (station "D"), and a transfer notice station (station "C") as notification target radio base station identification information, in step S403. The PHS navigation terminal 2 stores the received notification target radio base station identification information in the internal memory 205 in step S404, and disconnects the radio channel to the radio base station 11 in step S405.

When the PHS navigation terminal 2 has arrived at the station "B", it performs position registration with the radio base station 12 equipped in the station "B" using the automatic position registration function in step S406. In this case, the terminal 2 receives the identification number of the radio base station 12. Then, the terminal 2 compares the notification target radio base station identification information received in step S403 with the identification information of the radio base station 12, and if it is determined that the identification information of the radio base station 12 does not match any notification target radio base station identification information (S407 to S410), the terminal 2 waits for the next position registration.

When the PHS navigation terminal 2 has arrived at the station "C", it performs position registration to the radio base station 13 equipped in the station "C", and compares the identification information of the radio base station 13 and the notification target radio base station identification information (S407). Since the station "C" is the notification target of the transfer notice station, a transfer notice message is displayed on the display unit 206 to notify the user of the transfer notice in step S411.

When the PHS navigation terminal 2 has arrived at the station "D", it performs position registration to the radio base station 14, and compares the identification information of the radio base station 14 and the notification target radio base station identification information (S408). Since it is determined as a result of comparison in step S408 that the station "D" is the notification target of the transfer station, a message is displayed on the display unit 206 to notify the user of the transfer station in step S412. Furthermore, since the station "D" is also the target place arrival notice station with respect to the station "E" as the target place, a target place arrival notice message is displayed on the display unit 206 to notify the user of the target place arrival notice in step S413. When the PHS navigation terminal 2 has arrived at the station "E", it performs position registration to the radio base station 15, and compares the identification information of the radio base station 15 and the notification target radio base station identification information (S410). Since it is determined as a result of comparison that the station "E" is the target place, a message indicating that the user has arrived the target place is displayed on the display unit 206.

If no target place is input in step S402, the control waits for an input dial number in step S415. If the dial number is input, speech communication processing is performed in step S416. Upon completion of the speech communication, the radio channel is disconnected in step S417.

In this embodiment, notification from the navigation terminal is attained using a display unit. However, the present invention is not limited to this. For example, the notification may be audibly attained using, e.g., a voice, signal tone, or the like, or may be attained by the vibration of the navigation terminal.

(Second Embodiment)

Figure 5:
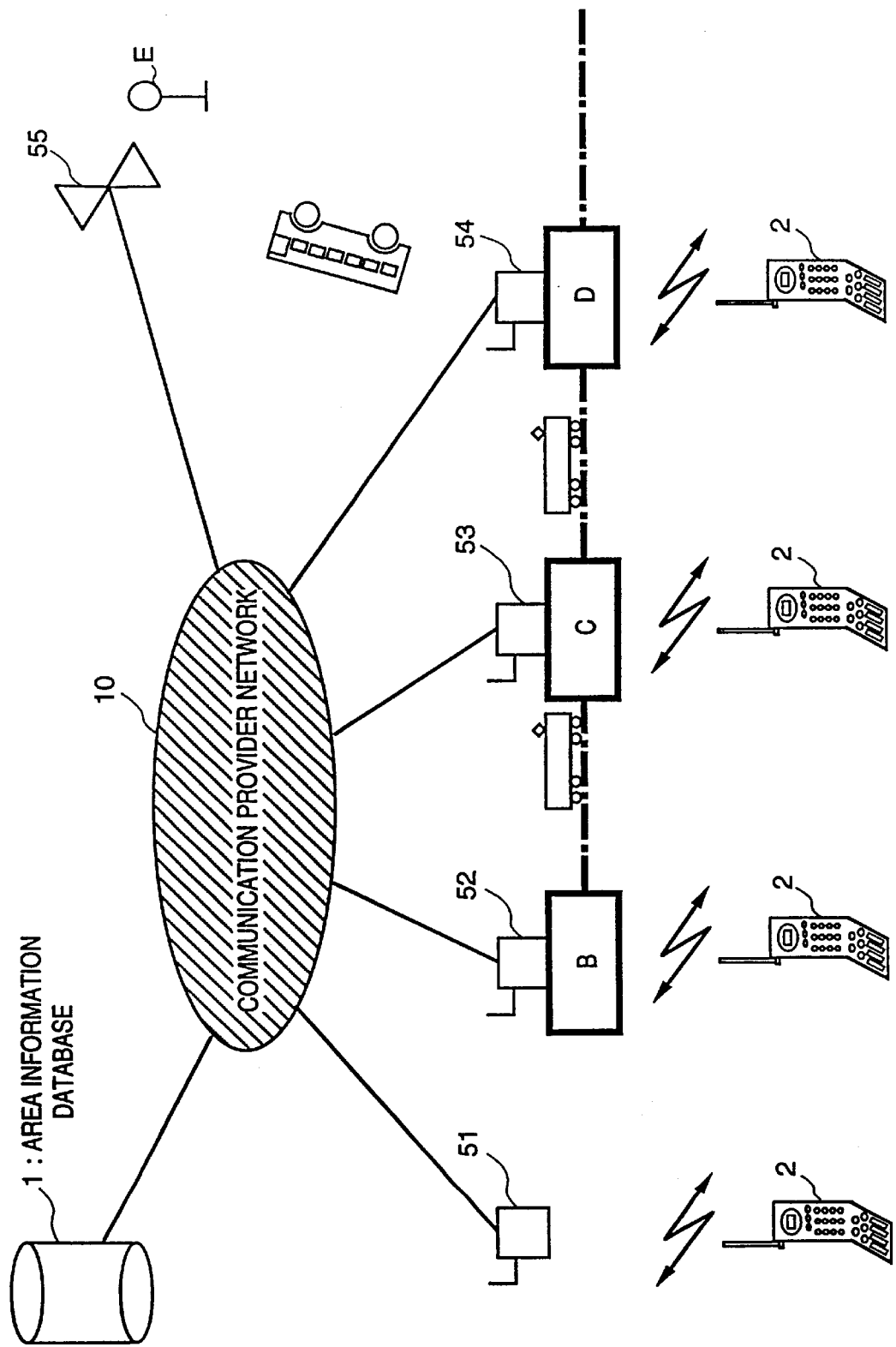
FIG. 5 is a diagram showing the concept of a navigation system according to the second embodiment of the present invention.

FIG. 5 shows the arrangement of a microcell type radio telephone system used in the second embodiment.

Referring to FIG. 5, reference numeral 1 denotes an area information database for managing identification information of radio base stations, area information of areas to be covered by the radio base stations, and area information based on dial numbers; 2, a PHS navigation terminal with a display function; 10, a communication provider network that accommodates the radio base stations and the database; and 51 to 54, radio base stations. The radio base stations 52 to 54 respectively cover a station "B", a station "C", and a station "D" as areas. Reference numeral 55 denotes an individual line telephone.

Although the functional block arrangement of the PHS navigation terminal is the same as that shown in FIG. 2, the internal memory 205 can store the dial number of the partner station of a speech communication, and the operation unit 207 includes a function key (to be referred to as a navigation key in this embodiment) used when the terminal serves as a navigation terminal.

Figure 6:
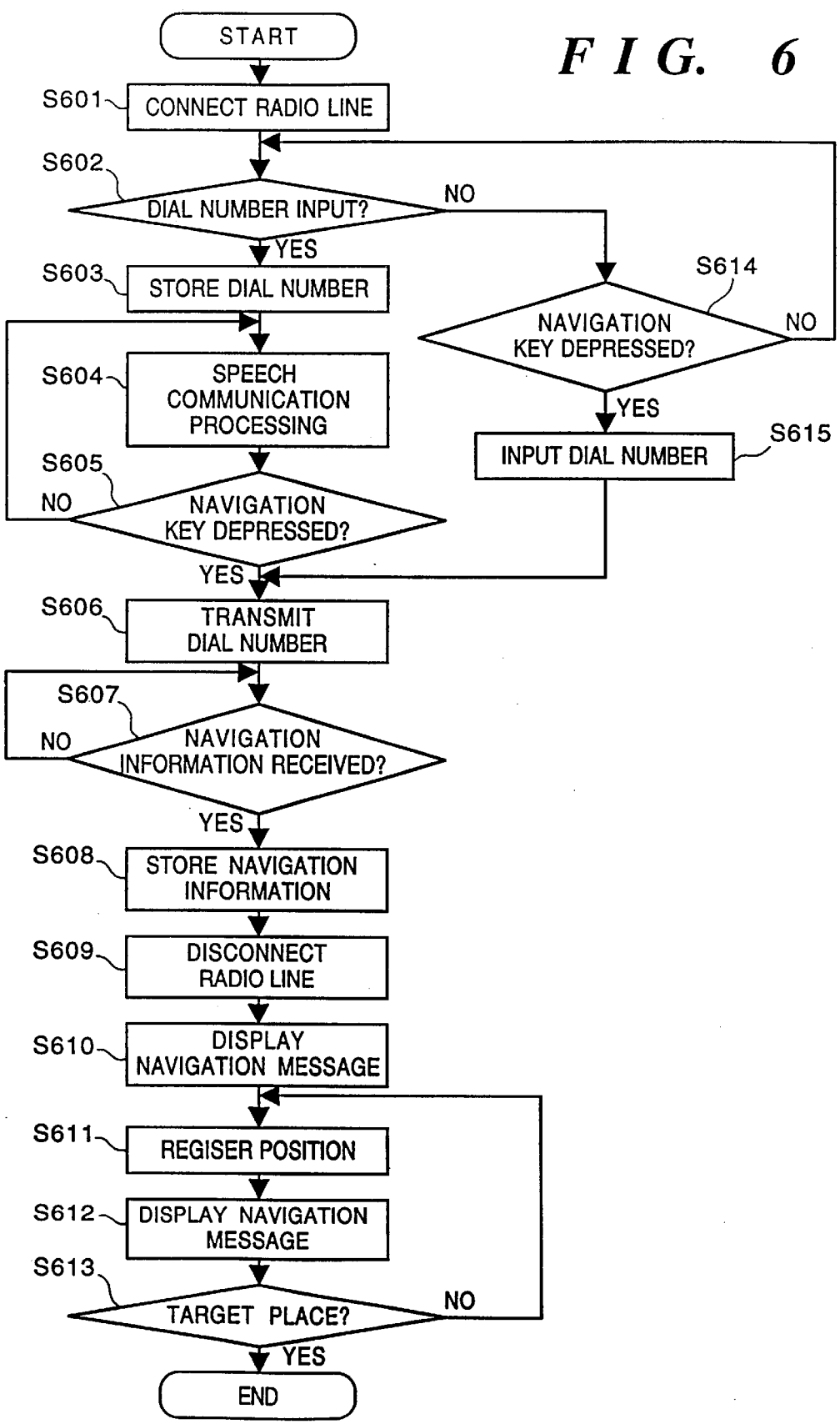
FIG. 6 is a flow chart showing the operation of a PHS simple navigation terminal in the second embodiment of the present invention.

FIG. 6 is a flow chart showing the operation of the PHS navigation terminal of this embodiment.

Referring to FIG. 6, a radio channel is connected by performing, e.g., an off-hook operation in step S601. If a dial number is input in step S602, the input dial number is stored in the internal memory 205 in step S603, and speech communication processing is performed in step S604. If the navigation key is depressed in step S605, the dial number stored in step S602 and information indicating that the dial number is that of a partner station when the PHS terminal serves as a navigation terminal are transmitted to the radio base station in step S606. If the radio base station determines that the dial number is that of the partner station when the PHS terminal serves as a navigation terminal, it transmits the dial number to the area information database 1 together with its own identification information. Upon reception of the dial number, the area information database 1 detects a telephone or a radio base station corresponding to the received dial number, and sends back navigation information of the route to a place where the dial number is present (to be referred to as a target place hereinafter) using area information from the radio base station that has transmitted the dial number to the telephone or the radio base station corresponding to the dial number. The navigation information includes identification information of radio base stations present along the route. Upon reception of the navigation information, the radio base station transmits the received navigation information to the PHS navigation terminal 2.

Upon reception of the navigation information in step S607, the PHS navigation terminal 2 stores the received information in its internal memory in step S608. Upon completion of the reception of the navigation information, the PHS navigation terminal 2 disconnects the radio channel, and performs a display operation based on the stored navigation information in step S610. For example, as shown in FIG. 5, if the area information database 1 determines the route from the current position of the PHS navigation terminal 2 to the target place such that the user goes to the station "B" as the nearest station, takes a train from the station "B" to the station "D", and then goes from the station "D" to a bus stop "E" by bus, the PHS navigation terminal 2 displays, for example, a message "take train at station "B"" in step S610.

When the user has arrived at the station "B", the PHS navigation terminal 2 performs position registration with respect to the radio base station of the station "B", and receives identification information of the radio base station in step S611. Then, the PHS navigation terminal 2 displays a navigation message on the basis of the received identification information and the stored navigation information in step S612. This display operation is repeated until the user arrives at the target place.

For example, when the user has arrived at the station "B", a message "take train and go to station "D"" is displayed, and when the user has arrived at the station "D", a message "go to bus stop "E" by bus" is displayed. If no dial number is input in step S602, and the dial number is input in step S615 after the navigation key is depressed in step S614, the flow advances to step S606 to perform the same operation as in the above description.

With the above navigation, the user can go from the current position to the target place via the shortest route.

(Third Embodiment)

In the first and second embodiments, the display unit displays a simple guidance message. Alternatively, a map may be displayed.

At this time, although the operation of the PHS navigation terminal is substantially the same as that shown in FIG. 6, a target place may be input using the operation unit as in the first embodiment. Also, navigation information received in step S607 is map information, and the map that indicates the current position of the PHS navigation terminal and the target position is displayed in step S610. Every time the position registration is performed in step S611, the current position of the PHS navigation terminal in the map displayed in step S612 may be moved.

(Fourth Embodiment)

In this embodiment, a PHS navigation terminal displays map information in a cell corresponding to its current position without setting any target place, or the like.

The system arrangement of this embodiment is the same as that of the second embodiment shown in FIG. 5.

In this embodiment, the area information database has map information near each radio base station.

The internal arrangement of the PHS navigation terminal 2 is substantially the same as that shown in FIG. 2. In this embodiment, the operation unit 207 has a navigation key for instructing a navigation function, and the display unit 206 can display a map.

Figure 7:
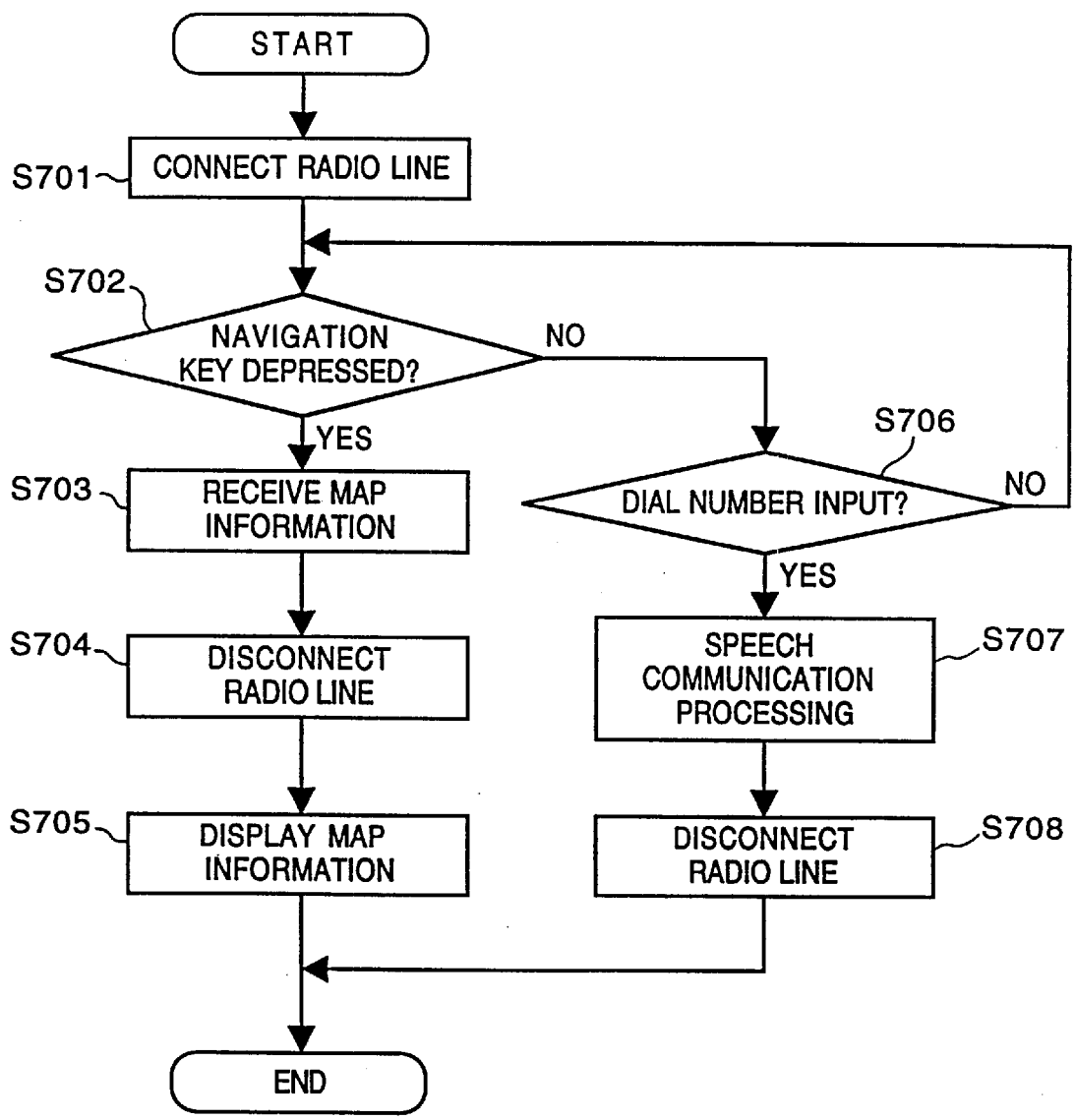
FIG. 7 is a flow chart showing the operation of a PHS simple navigation terminal according to the fourth embodiment of the present invention.

FIG. 7 is a flow chart showing the operation of the PHS navigation terminal 2.

Referring to FIG. 7, the PHS navigation terminal 2 connects a radio channel to the radio base station by performing, e.g., an off-hook operation in step S701. When the navigation key is depressed in step S702, the PHS navigation terminal 2 transmits information for instructing the navigation function and its own identification information to the radio base station.

Upon reception of the information for instructing the navigation function, the radio base station connects the area information database and reads out map information of a cell corresponding to the position of the radio base station. The radio base station transmits the readout map information to the PHS navigation terminal 2.

Upon reception of the map information from the area information database 1 in step S703, the PHS navigation terminal 2 disconnects the radio channel in step S704. The terminal 2 displays the received map information on the display unit 206 in step S705. In the display operation in this case, when the PHS navigation terminal 2 receives map information from the radio base station 51, it can display a map of the area near the radio base station 51; when the terminal 2 receives map information from the radio base station in the station such as the radio base stations 52 to 54, it can display a map of the station precincts.

If the navigation key is not depressed in step S702, and a dial number is input instep S706, speech communication processing is performed in step S707. When the speech communication has ended and, for example, an on-hook operation is performed, the radio channel is disconnected in step S708.

As described above, since the PHS navigation terminal displays a map near the radio base station which covers, as an area, a cell including the current position of the terminal, a user can recognize the area features near the PHS navigation terminal.

In this embodiment, the radio base station connects the area information database to read out map information. If neighboring maps are stored in units of radio base stations, the need for the area information database can be obviated, and the same effect as in this embodiment can be obtained by storing a small amount of data in the radio base station. Also, neighboring maps may be stored in units of base stations, and the displayed map may be updated by map data read out from the area information database at predetermined intervals (e.g., upon each access), thus reducing the traffic.

(Fifth Embodiment)

When a map is displayed like in the fourth embodiment, the display unit is required to have a certain size. For this reason, in this embodiment, a display unit interface 801 is arranged, as shown in FIG. 8, so that a display 802 can be connected thereto.

Figure 8:
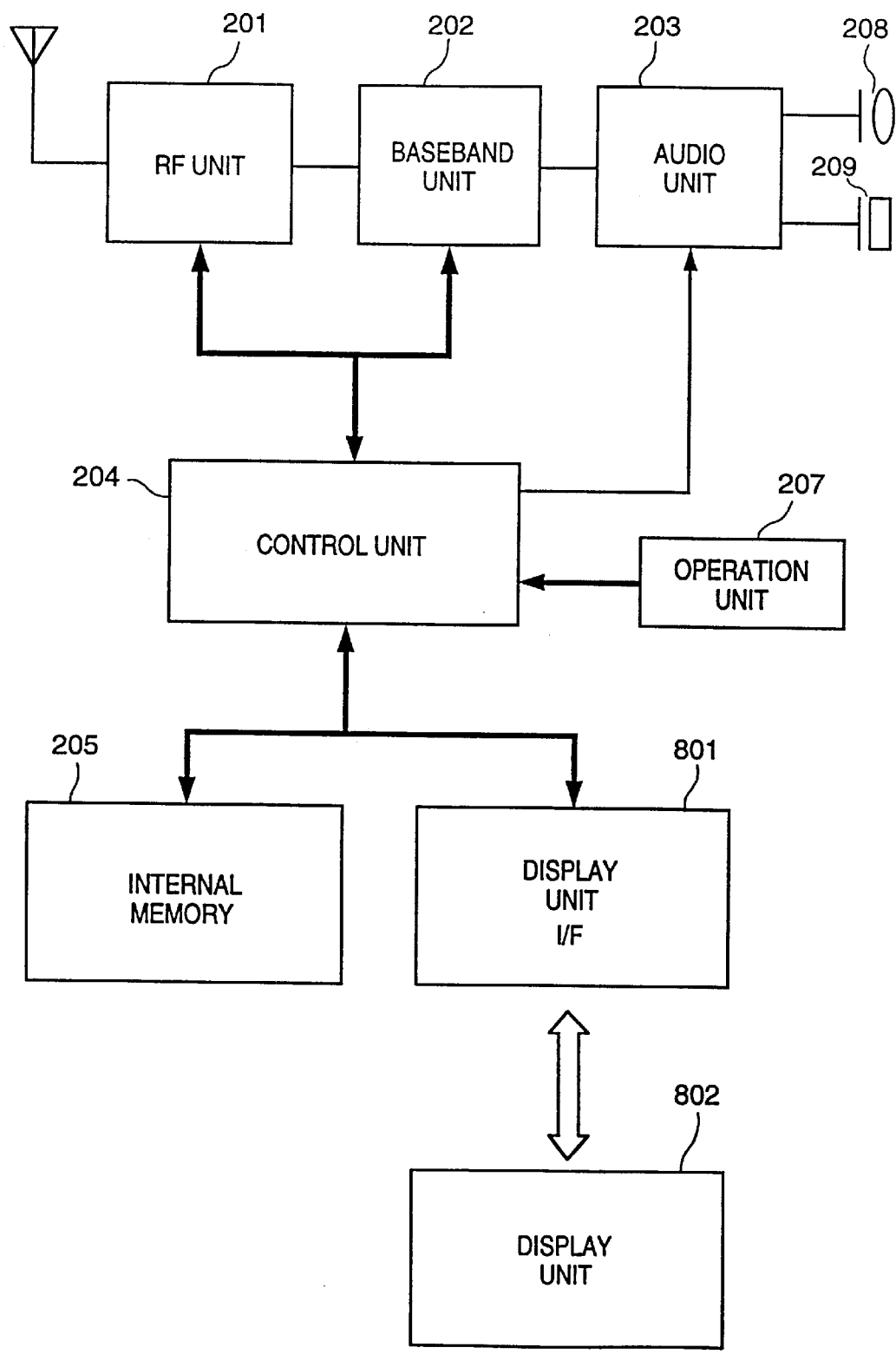
FIG. 8 is a block diagram showing the arrangement of a PHS simple navigation terminal according to the fifth embodiment of the present invention.

Referring to FIG. 8, the display unit interface 801 transmits display information such as a map to the connected display 802, which, in turn, displays display information transmitted from the display unit interface 801.

With this arrangement, the user can observe displayed contents more easily.

As described above, since a cellular type radio communication system such as a PHS with an automatic position registration function is used as a position searching medium, sufficient navigation required upon traveling on foot or by train can be realized without storing any large-capacity map information in a radio communication terminal. In addition, even in the closed space such as an underground market or building, the navigation function is available as long as such place falls within the service area of the cellular type radio communication system.

The above embodiments have exemplified a system using a personal handyphone system (PHS) as a radio communication medium as an example of the medium of the cellular type radio communication system with an automatic position registration function. However, the same effect can be obtained when other cellular type radio communication systems such as a DECT (digital European cordless telecommunication system), a PCS (personal communication service system), and the like with a position registration function of a digital cordless telephone.

The above embodiments have exemplified the railway transfer navigation system as an embodiment of a navigation system that utilizes a communication provider network to connect radio base stations. Alternatively, the present invention may be applied to a navigation system movement in the building or precincts as one for a limited area while utilizing a private communication network to connect radio base stations.

Also, the present invention can also be applied to a navigation system upon travelling on roads when the area information database manages map information including road information, and a digital cordless telephone terminal can store map information.

As many apparently widely different embodiments of the present invention can be made without departing from the spirit and scope thereof, it is to be understood that the invention is not limited to the specific embodiments thereof except as defined in the appended claims.

What is claimed is:

1. A radio communication device communicating via a base station, comprising:
   input unit for inputting identification information for specifying a communication device;
   determination unit for determining whether or not execution of a guidance function regarding a place of the communication device specified by the identification information has been instructed by user operation;
   communication unit for communicating with the communication device specified by the identification information; and
   transmission unit for transmitting the identification information to the base station as information for execution of the guidance function if it is determined that the execution of the guidance function has been instructed and for transmitting the identification information to the base station as information for communication with the communication device if it is determined that the execution of the guidance function has not been instructed.

2. The device according to claim 1, wherein the guidance function is a navigation function, which executes navigation to the place of the communication device specified by the identification information.

3. The device according to claim 2, wherein the navigation function executes navigation on the basis of information received from another apparatus.

4. The device according to claim 2, wherein the navigation function executes navigation on the basis of identification information of a radio base station.

5. A control method of a radio communication device comprising input unit for inputting identification information for specifying a communication device communicated via a base station, the method comprising the step of:
   determining whether or not execution of a guidance function regarding a place of the communication device specified by the identification information has been instructed by user operation; and
   transmitting the identification information to the base station as information for execution of the guidance function if it is determined that the execution of the guidance function has been instructed and transmitting the identification information to the base station as information for communication with the communication device if it is determined that the execution of the guidance function has not been instructed.

6. The method according to claim 5, wherein the guidance function is a navigation function, which executes navigation to the place of the communication device specified by the identification information.

7. The method according to claim 6, wherein the navigation function executes navigation on the basis of information received from another apparatus.

8. The method according to claim 6, wherein the navigation function executes navigation on the basis of identification information of a radio base station.

* * * * *